(12) United States Patent
Maidhof et al.

(10) Patent No.: US 7,414,732 B2
(45) Date of Patent: Aug. 19, 2008

(54) METHOD AND DEVICE FOR DETERMINING THE 3D PROFILE OF AN OBJECT

(75) Inventors: Armin Maidhof, Kolbermoor (DE); Peter Andrä, Neubeuern (DE); Manfred Adlhart, Kösen (AT); Michael Kaus, Bensheim/Auerbach (DE); Markus Basel, Bischofsheim (DE); Frank Thoss, Neubeuern (DE); Markus Lazar, Nussdorf (DE); Thomas Nasswetter, Raubling (DE); Hans Steinbichler, Neubeuern (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 419 days.

(21) Appl. No.: 10/276,632

(22) PCT Filed: May 16, 2001

(86) PCT No.: PCT/EP01/05598

§ 371 (c)(1),
(2), (4) Date: Nov. 18, 2002

(87) PCT Pub. No.: WO01/88471

PCT Pub. Date: Nov. 22, 2001

(65) Prior Publication Data

US 2003/0112448 A1 Jun. 19, 2003

(30) Foreign Application Priority Data

May 16, 2000 (DE) ................................ 100 23 845

(51) Int. Cl.
*G01B 11/24* (2006.01)
*G01B 11/30* (2006.01)
*G01B 7/00* (2006.01)
*G01B 15/00* (2006.01)
*G01N 21/86* (2006.01)
*G01V 8/00* (2006.01)
*G06K 9/00* (2006.01)
*G01C 9/00* (2006.01)
*G01C 17/00* (2006.01)
*G01C 19/00* (2006.01)
*G06F 15/00* (2006.01)

(52) U.S. Cl. .................. 356/601; 250/559.22; 382/154; 702/152; 702/155

(58) Field of Classification Search ........................ 250/559.01–559.33; 356/601–640; 702/150–155; 382/154

See application file for complete search history.

(56) References Cited

U.S. PATENT DOCUMENTS 4,803,645 A * 2/1989 Ohtomo et al. ............. 702/167
5,102,223 A * 4/1992 Uesugi et al. ............... 356/607

(Continued)

FOREIGN PATENT DOCUMENTS

DE 19536294 4/1997

(Continued)

*Primary Examiner*—Gregory J. Toatley, Jr.
*Assistant Examiner*—Gordon J Stock, Jr.
(74) *Attorney, Agent, or Firm*—Dilworth & Barrese, LLP.

(57) ABSTRACT

The invention relates to a method for determining the 3D profile of an object. In order to improve a method of this type, several sections of the object (5) are measured. During at least one measuring operation, at least one reference object (4) is measured. The measured sections of the object (5) are combined (1).

37 Claims, 1 Drawing Sheet

U.S. PATENT DOCUMENTS

| | | | |
|---|---|---|---|
| 5,267,143 A | | 11/1993 | Pryor |
| 5,506,682 A | * | 4/1996 | Pryor .................... 356/623 |
| 5,557,410 A | * | 9/1996 | Huber et al. ............ 356/604 |
| 5,638,461 A | * | 6/1997 | Fridge .................... 382/141 |
| 5,642,293 A | * | 6/1997 | Manthey et al. .......... 702/42 |
| 5,757,674 A | * | 5/1998 | Marugame ............... 702/152 |
| 5,805,289 A | | 9/1998 | Corby, Jr. et al. |
| 5,956,417 A | * | 9/1999 | Pryor .................... 382/154 |
| 5,973,788 A | * | 10/1999 | Pettersen et al. ......... 356/614 |
| 5,978,521 A | | 11/1999 | Michael et al. |
| 6,166,809 A | * | 12/2000 | Pettersen et al. ......... 356/612 |
| 6,389,158 B1 | * | 5/2002 | Pettersen et al. ......... 382/154 |
| 6,466,325 B1 | * | 10/2002 | Gooch .................... 356/620 |
| 6,990,215 B1 | * | 1/2006 | Brown et al. ............ 382/106 |
| 7,206,080 B2 | * | 4/2007 | Kochi et al. ............. 356/611 |

FOREIGN PATENT DOCUMENTS

| | | |
|---|---|---|
| DE | 19613978 | 10/1997 |
| DE | 19840334 | 8/1999 |

* cited by examiner

METHOD AND DEVICE FOR DETERMINING THE 3D PROFILE OF AN OBJECT

BACKGROUND OF THE INVENTION

The invention pertains to a method and a device for determining the 3D shape of an object. The object may also be referred to as the measured object. The method and the device make it possible to determine, in particular, the spatial 3D coordinates of surface points of the object or measured object, respectively.

Tactile and optical methods are primarily utilized for determining the shape of objects. In comparison with tactile-scanning coordinate measuring machines, optical 3D measuring methods make it possible to carry out a contactless, full-surface and time-efficient measurement of complicated object shapes of various sizes.

In the meantime, a series of optical sensors with different properties were developed for the field of optical metrology. For example, the complete 3D shape of surfaces is frequently measured with optical triangulation methods (strip projection, Moire). However, various 3D measuring arrangements with coherent light (laser scanning method, interferometric contouring method) are also known.

Tactile and optical methods are required in the field of three-dimensional coordinate metrology, in full-surface 3D nominal/actual measurements and surface tests on technical objects, and in the inspection and position control of components, in particular, of motor vehicles or modeling and tool moulds.

Due to the limited measuring volumes and the limited resolution capacity of available three-dimensional coordinate measuring devices (in the following referred to as 3D-KMG), it is necessary to assemble the measuring data of individual partial measuring fields into the 3D shape of the entire object similar to a mosaic, namely with the least possible loss in accuracy and surface structure resolution, when measuring highly structured objects and large-surface objects.

There exist various (tactile and optical) measuring methods and 3D sensors for measuring 3D coordinates and for determining the 3D shape of objects. The variety of proposed measuring and evaluation strategies is exceptionally broad. With respect to optical measuring methods, important measuring principles are the triangulation method and the interferometry method. The triangulation and the contour measuring method are of the utmost practical importance for determining shapes and for surface controls. In many measuring tasks, a full-surface and consequently simultaneous acquisition of contour data of the entire surface is advantageous. Imaging contour measuring methods (strip projection, Moire, interferometric contouring method) are used for such tasks in the form of so-called field measuring methods. With respect to full-surface optical measuring systems, strip projection methods with a matrix camera and a projector for non-coded or coded strips are known, wherein the three-dimensional coordinates of the surface points are calculated from the image coordinates of the camera image and the strip numbers detected on the respective image coordinate based on geometric models of the measuring arrangement. In other known methods that are based on photogrammetry, several cameras and projectors are utilized. Laser triangulation methods that operate point-by-point and line-by-line are, in part, supplemented with expensive scanning and handling mechanisms for realizing a full-surface scanning. Imaging triangulation methods from the field of photogrammetry make it possible to measure a series of individual points with high accuracy.

All 3D measuring methods and systems have a common problem that is caused by the measuring principle, namely that an individual surface measurement by means of 3D-KMG is not sufficient for determining the complete shape of an object to be measured, e.g., in an allround measurement. This is the reason why objects are recorded and measured from several directions with a movable 3D-KMG or several 3D-KMG. The spatial arrangement of the 3D-KMG relative to the object may change, e.g., when repositioning the measuring device or the measured object. If the corresponding positions of the 3D-KMG relative to the measured object are known, the corresponding individual measurements can be linked similar to a mosaic in order to reconstruct the complete object. The 3D object coordinates acquired in the respective device coordinate system (in the following referred to as device-KOS) by means of individual measurements are transformed into the fixed coordinate system of the 3D measuring arrangement or the reference coordinate system (in the following referred to as reference-KOS) by means of a geometric transformation rule.

The following steps are carried out:
1. Determining the unknown parameters of the transformation between the device-KOS and the reference-KOS;
2. Carrying out the transformation into the data sets of the individual measuring fields, i.e., calculating the 3D coordinates in the reference-KOS with the aid of the calculated transformation parameters.

One metrological problem can be seen in the fact that inaccuracies in the position values result in gaps between the individual fields, as well as in a reduced accuracy, over the complete object surface. The invention aims to solve this problem.

Various methods and system solutions are known for determining the positions of the measuring device and for linking the individual measuring fields.

In addition to tactile probes, optical 3D sensors are used which are positioned in the required measuring positions and aligned relative to the object by means of a mechanical guidance system (e.g., multiaxis CNC, coordinate measuring machines, measuring arms, robots). The position values are predetermined for the guidance system (internal glass measuring rods), wherein the transformation rule to be applied for linking the individual measuring fields is determined from said position values. The accuracy of the entire measurement requires complicated designs of the motion mechanics. The high constructive and monetary expenditure for realizing the guidance and measuring system is considered disadvantageous. Despite the high expenditures, significant residual errors and gaps between the measuring data remain, in particular, in multiaxis positioning systems. The definition of the path movement, the measuring volume and the displacement speed for the CNC machine requires a significant expenditure of time. Another disadvantage can be seen in the fact that the measured object needs to be transported to the measuring system, i.e., a mobile measurement cannot be realized with systems of this type. Special embodiments contain sensors that are mounted on a movable "measuring arm", (e.g., an articulated arm). Although the simple portability of these devices makes it possible to carry out mobile measurements, the object measuring range is limited to approximately 1 m.

There also exist systems in which the sensor (or the tactile probe) is guided over the object manually or with the assistance of motion mechanics while measurements are carried out. The movement and position of the sensor is detected by means of an external (e.g., optoelectronic) reference measuring system that is fixed in space and the position data of which are used for linking the individual measurements. This solution requires a high accuracy of the reference measuring system. The mobility of the system is limited due to the fact that the sensor always needs to be situated within the measuring range of the reference measuring system.

There also exist photogrammetric methods and systems that are able to determine the spatial position of a camera (or a projector) relative to several visible reference points, the coordinates of which in space are predetermined (spatial step backward). In other known photogrammetric methods and systems, it is possible to determine several spatial positions of a camera (or a projector) or the spatial positions of several cameras (or projectors) relative to one another as long as the halftone and phase images recorded from different directions contain several common measuring points, e.g., in the form of measuring markings, the coordinates of which do not have been known beforehand (bundle compensation). In this method, the coordinates of these measuring points are calculated in addition to the positions of the cameras or projectors (simultaneous calibration). A length reference is introduced as the scale.

There also exist photogrammetric orientation methods that make it possible to determine the spatial position of an optoelectronic 3D sensor (consisting of at least one camera and one projector), a camera or a projector relative to several visible reference points, the coordinates of which in space are predetermined. A reference network of individual measuring points which is arranged stationarily referred to the measured object makes it possible to assemble the measuring data of individual partial measurements. It is known that such reference points, e.g., in the form of measuring markings, may be arranged on the object itself or outside the object, e.g., on external measuring cages or connecting links (DE 198 40 334 A1, DE 195 36 294 A1).

Prerequisites for a sufficiently accurate determination of the position of optoelectronic sensors by means of a reference network are a minimum of three to four measuring markings in a sensor recording, as well as their largely uniform distribution in the measuring field. Consequently, a large number of coded and non-coded measuring markings needs to be used for measuring large objects. The positioning of these measuring markings and, if applicable, their spacing consequently are very time-consuming (high expenditure of labor). In addition, significant parts of the surface of the measured object are covered by the adhesive markings or the measuring cage or connecting link used. If the minimum number of measuring markings or their uniform distribution in the measuring field cannot be ensured when measuring objects with a complex structure, i.e., objects that are not two-dimensional, the object cannot be completely measured. When measuring objects with a size of more than 1 cubic meter, measuring cages or connecting links become difficult to handle and transport due to the required large size and heavy weight. This means that the advantage of a mobile measuring system is lost. The accuracy is reduced due to an insufficient stability of the connecting link, in particular, if its mass is reduced. The calibration of the markings always requires the utilization of an additional measuring system and consequently is associated with an increased expenditure of labor.

In other known methods, a so-called matching (also referred to as registering) of 3D data sets that are primarily obtained with the aid of optical field measuring methods is carried out. In this case, the positions of two 3D-KMG relative to one another or two positions of one movable 3D-KMG are determined from overlapping 3D data sets. These methods are also used for matching measured 3D data sets with predetermined CAD models of these objects in order to carry out a nominal/actual comparison. When matching 3D data sets, numerical compensation methods are applied which calculate the required transformation from one 3D data set into the other 3D data set, i.e., the transformation parameters. This makes it possible to carry out the transformation between the spatially changed device-KOS. One device-KOS is usually defined relative to the reference-KOS such that the 3D data of different device-KOS can be transformed to this reference-KOS. This results in a uniform surface description with 3D object coordinates in the reference-KOS.

Matching methods require a sufficient overlap between the individual measuring fields and a sufficient structuring of the object surface. The individual transformations can otherwise not be determined in a sufficiently definitive and accurate fashion. This means that the limited accuracy over the entire object and the dependence of the measuring result quality on the structure of the object represent two of the more significant disadvantages of these methods. This method is entirely unsuitable for smooth object surfaces (no definitive solution of the transformation).

SUMMARY OF THE INVENTION

The invention is based on the objective of proposing an improved method and an improved device of the initially described type.

In a method for determining the 3D shape of an object, this objective is attained with the characteristics herein. According to the invention, several regions of the object are measured. In this context, the term several regions refers to at least two regions. The 3D coordinates of the measured object and the surface of the measured object are determined in these measurements. At least one reference object is measured during at least one measurement. The measured regions of the object are linked with one another. This linking or matching is carried out with reference to a coordinate system. The reference object is usually situated in a position, the coordinates of which relative to the measured object are unknown. In the method according to the invention, it is not necessary to predetermine the position of the reference object relative to the measured object. This means that the reference object does not have to be positioned in a certain predetermined position relative to the measured object. However, the reference object needs to maintain the position in which it is situated during the measurement. Consequently, the reference object is situated in a stationary (fixed, stable) position relative to the measured object during the measurement.

In a method for determining the 3D shape of an object, this objective is attained with the characteristics of herein. According to the invention, several regions of the object are measured. In this context, the term several regions refers to at least two regions. The 3D coordinates of the measured object and the surface of the measured object are determined in these measurements. At least one reference object is measured during at least one measurement. The measured regions of the object are linked with one another. This linking or matching is carried out with reference to a coordinate system. The reference object is usually situated in a position, the coordinates of which relative to the measured object are unknown. In the method according to the invention, it is not necessary to predetermine the position of the reference object relative to the measured object. This means that the reference object does not have to be positioned in a certain predetermined position relative to the measured object. However, the reference object needs to maintain the position in which it is situated during the measurement. Consequently, the reference object is situated in a stationary (fixed, stable) position relative to the measured object during the measurement.

The reference object may consist of a previously measured reference object. The position and/or spacing of the reference object in space consequently may be known, for example, from a prior measurement. However, the reference objects do not necessarily have to be measured beforehand. Reference objects of this type, the position and/or spacing of which are not known beforehand, are referred to as auxiliary objects below. However, they are considered to be reference object in the sense of the invention.

With respect to a device for determining the 3D shape of an object, the objective of the invention is attained with a 3D ordinate measuring device (3D-KMG) that, in particular, operates in a mechanical-tactile and/or optical-contactless fashion, at least one reference object and a computer for linking (matching) the measured regions of the object.

Advantageous additional developments are disclosed in the dependent claims.

Advantageous additional developments are also disclosed herein.

The invention proposes a method and a device for realizing coordinate measurements with optical and/or tactile 3D coordinate measuring devices (by utilizing 3D references) The technical field of application is the determination of complete 3D shapes or the 3D shape of bodies or objects in space or even complete scenes (measured object) which are respectively composed of several measuring fields obtained with at least one, in particular, optical and/or tactile coordinate measuring device that delivers the 3D surface coordinates, and with at least one reference object or reference body.

The carrier of the reference object may also consist of the measured object itself. The reference object or the reference objects may be situated on the measured object. However, it is also possible for the reference object to be situated outside the measured object.

In the following portion of the description, the optical and/or tactile coordinate measuring system used for carrying out the method according to the invention is referred to as the 3D coordinate measuring device (3D-KMG), the required reference body is referred to as the 3D reference device, the required arrangement consisting of at least one 3D coordinate measuring device and at least one 3D reference device is referred to as the 3D measuring arrangement, and the method for assembling several measuring fields is referred to as the 3D coordinate measuring method or the 3D reconstruction method.

The 3D measuring arrangement and the method are used in the field of 3D metrology. The calculation results in the 3D surface points of an object or a scene in the form of 3D coordinates that refer to a fixed origin of coordinates in space, i.e., relative to a reference coordinate system. The coordinate system (KOS) of the 3D coordinate measuring device is referred to as the sensor or device KOS, and the fixed reference coordinate system in space of the entire 3D measuring arrangement is referred to as the reference KOS.

The calculated 3D surface points can be additionally processed, for example, in a CAD/CAE system for the purpose of a surface regeneration, for a nominal/actual comparison or for generating milling data. The method and the device are, in particular, suitable for the field of mobile metrology.

The invention pertains to a method for metrologically determining the spatial 3D position of surface points of a measured object, wherein a device is used which serves as a 3D reference in the three-dimensional measurement of extensive objects.

The invention also pertains to a method for generating and linking 3D data sets by means of 3D-KMG (3D reconstruction method), wherein a device is used which serves as a reference in order to determine the three-dimensional shape and structure of extensive objects as comprehensively as possible.

The invention provides a 3D reconstruction method of the initially described type and a device for carrying out such a method which make it possible to three-dimensionally measure objects and object structures in a highly precise fashion, namely with, in particular, tactile and/or optical 3D coordinate measuring devices. In this case, the spatial arrangement or position of the 3D-KMG relative to the measured object may change, but the partial views can subsequently still be assembled in a globally precise and fitted fashion (by utilizing a 3D reference).

As mentioned above, the invention pertains to a method for linking 3D data sets and a 3D measuring arrangement so as to realize a complete three-dimensional determination of the shape of measured objects by means of at least one coordinate measuring device (sensor or probe) and at least one reference object. The positions and/or spacing of the reference objects in space may be known or unknown. Parts of the object surface and the reference surface may be used for matching the measured surface regions.

The advantage of the method according to the invention in comparison with previously known methods can be seen in the fact that a high accuracy is achieved in linking the measuring fields within the overlapping regions of the measuring fields, as well as over the complete surface of the object, with a small number of 3D references. Consequently, the new method largely prevents a dependence of the measuring result quality on the structure of the object.

Another advantage can be seen in a simplified handling of the entire measuring system and the flexibility with respect to the measurements of different objects. The new method allows a simple measurement of smooth surfaces without any structure, in particular, of large-surface objects, as well as the measurement of highly structured surface regions on which references can, if at all, only be arranged with great difficulty. The completeness of the object measurement without any gaps in the data set that can be ensured with absolute certainty.

The method allows a high mobility of the entire measuring system. The reference bodies can be easily handled and transported due to the low weight. However, a high stability of the reference structure is still achieved.

One particular advantage is that a minimum number of reference points is not required in the individual measurements. This advantageously reduces the costs, as well as the expenditure of labor and time, in arranging and spacing the reference objects. In addition, the masking of the measured object by the reference objects is reduced to a minimum.

The method allows a high measuring speed and consequently a short object occupation time.

According to the invention, it is possible to utilize a method in which the previously known, unknown and measured parameters of the object and, if applicable, measuring points in overlapping measuring fields are compared with one another, and in which transformations between the two data sets are calculated and carried out.

The known parameters of the reference object in the reference-KOS are compared with parameters in the 3D-KMG-KOS which were determined in measurements, the parameters of the reference objects which were determined in measurements within the overlapping regions of the measuring fields are compared in different KMG-KOS, the positions of the measuring points on the object surfaces are compared in overlapping measuring fields, correspondences between the objects and/or the measuring points of the recordings can be produced, in particular, by means of numerical compensation methods from the above-mentioned comparison, with transformation matrixes being calculated which transform one or more KMG-KOS into the reference KOS, as well as one KMG-KOS into another KMG-KOS, and consequently all KMG-KOS into the reference-KOS, the transformation matrixes are used for transforming the coordinates of the object which were measured by means of at least one 3D-KMG in the KMG-KOS into the reference-KOS.

According to one advantageous additional development, the reference objects may be geometrically regular or irregular and described mathematical-geometrically such that not only their position, center point coordinate or spacing in space can be used, but also other geometric parameters, e.g., radius, curvature and the like. Such geometric parameters can also be obtained from descriptions of the surface and its structures with fractal geometry methods, the wavelet analysis, etc.

According to another additional development, the reference objects may be geometrically regular or irregular. If the reference points can be described mathematical-geometrically, their geometric parameters, e.g., radius, curvature and the like, can be used.

It is possible to change the distribution or reduce the number of measuring points in one or more recordings and/or to combine several measuring points. It is also possible to transform and additionally utilize the measured or changed 3D surface points of one or more recordings into a surface description (e.g., triangular network description, spline surface description or the like).

Reference objects may be one-dimensional, two-dimensional or three-dimensional, e.g., a marked point, a marked line or grid, a measuring or signal marking, a 3D object structure, etc.

Signal markings consist, for example, of reflecting and/or scattering signal markings (measuring markings) with an illumination device (even the sensor itself) or light-emitting signal markings.

3D object structures advantageously consists, for example, of individual reflecting and/or scattering regular bodies, e.g., cubes, spheres, pyramids or truncated pyramids. Other geometries would also be conceivable.

The reference objects may also be defined by the structure of the object, e.g., bores and edges.

Selected regions or measured surface points of the object to be measured may also be used as reference objects, with their geometric parameters being predetermined and utilized in the method. The spatial dimension or length of a measured object may, in particular, be taken into consideration in one or more dimensions during the matching process.

In optical measuring systems, the reference objects may, in particular, be realized by means of optical structure projection, e.g., circular markings, lines and grids.

In addition, reference objects may consist of mathematical, virtual or synthetic models in the form of a computer-generated data set and additionally incorporated into the method.

A definitive code allocation (coding, label, identification number etc.) of the reference objects or measuring points used is preferably carried out in the one or more recordings. When using optical structure projections in optical measuring systems, it is, in particular, possible to acquire relatively or incrementally measured data.

It is advantageous that the 3D coordinate measuring device itself—including a mechanical motion system-and an optionally provided mechanical motion system for the measured object can be calibrated or recalibrated during the matching process. It is also possible to determine unknown positions of the auxiliary objects and reference objects in space while the method is carried out. Such auxiliary and reference objects, the position of which has been measured, can be used as reference objects with equal success as a three-dimensionally measured object.

It is advantageous that, for example, non-coded markings, circular rings or strip structures can be used as auxiliary or reference objects. Since the method produces correspondences between identical objects in overlapping measuring fields, a definitive code allocation (coding/label) of the objects used can be realized.

It is also possible to utilize additional measuring data of the measuring system obtained from reference objects, auxiliary objects or objects to be measured in the matching process. These measuring data may, for example, consist of light intensity data when using optical measuring systems (e.g., color images, black/white images, video images of cameras) or motion data when using tactile systems (e.g., angle of excursion). It possible to allocate additional data to any spatial surface point.

It is particularly advantageous that the number of reference objects is not limited. A total of no more than 3 reference objects with known positions is required for transforming the complete data set into the reference-KOS. There is no required minimum number of measurable reference objects in an individual measurement of the 3D-KMG. Measuring fields without reference object can also be incorporated with this method.

In one advantageous embodiment, a device is used as the carrier of the reference objects. In this case, the device preferably consists of at least one arbitrarily shaped 1D, 2D or 3D reference body. The reference body may contain structural elements that may have the shape of lines or rods and be two-dimensional or three-dimensional. The reference body may also consist or be composed of these structural elements. This means that the reference bodies make consist of 2D or 3D object structures, for example, line structures, screen structures, net structures, polyhedral structures and other structures. The reference objects may be arranged on the reference body or the structural elements, respectively. At least one mounting device may also be arranged thereon. If a reference body or one or more structural elements are composed in a suitable fashion, for example, in the form of a profiled body with alternating structure, this reference body or structural element itself can be used as the reference object, on which additional reference objects may be fixed. The reference objects define the reference coordinate system and can be measured beforehand.

In addition, the reference bodies may also consist of measuring adapters or tracer pins that are situated in a certain position relative to the measured object or surface structures and on which reference objects, for example, in the form of signal markings, 3D object structures or the like may be a arranged.

The reference body or structural elements, respectively, may also be used as calibration bodies for checking the measuring results and for monitoring the KMG.

In order to measure an object, at least one reference body can be fixed or placed on, in front of or at least in the vicinity of the measured object by means of one or more mounting devices. In this case, the object can be measured from different directions.

BRIEF DESCRIPTION OF THE DRAWINGS

One embodiment of the invention is described below with reference to the enclosed figures. The figures show.

DESCRIPTION OF THE PREFERRED EMBODIMENTS

Figure 1:
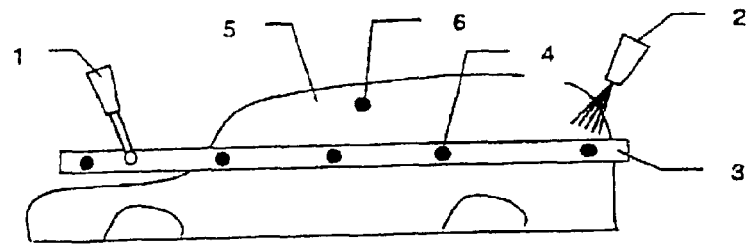
FIG. 1, a schematic side view of an object to be measured and a reference body.

In the embodiment shown in FIG. 1, at least one 3D-KMG is used, the tactile probe 1 or optoelectronic sensor 2 of which scans the object surfaces 5 and the reference objects 4, 6 in a tactile or contactless fashion. The surface of the measured object is identified by the reference symbol 5. The measured object 5 is connected to a reference body 3 that contains reference objects 4. Reference objects 6 are applied onto the measured object.

Figure 2:
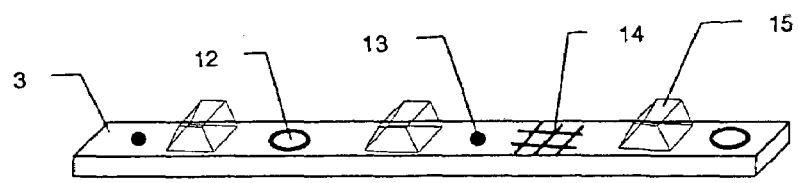
FIG. 2, a perspective representation of the reference body.

The rod-shaped reference body 3 shown in FIG. 2 contains various reference and auxiliary objects: measuring markings 12, measuring points 13, grids 14 and 3D object structures in the form of truncated pyramids 15. The tactile probe 1 or the optoelectronic sensor 2 delivers measuring signals that depend on the 3D shape of the measured object 5. The 3D coordinates of the surface points are calculated from the sequences of measuring signals. If so required, a device, in particular, a computer, is used for digitizing and storing the sequences of measuring signals or the 3D coordinates, for controlling the measuring sequence and for processing the measuring signals or the 3D coordinates. The sensor 2, the probe 1 or the 3D-KMG or the measured object can be freely moved in space manually or with motion mechanics; their position may, if so required, be measured. The 3D measuring arrangement shown in FIG. 1 consists of a tactile 3D coordinate measuring device 1 or an optical coordinate measuring device 2 and a reference body 3 with reference objects 4, as well as a measured object 5 with applied reference or auxiliary objects 6.

Figure 3:
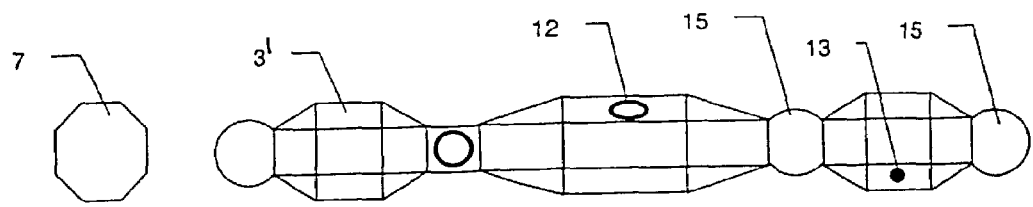
FIG. 3, a schematic side view of another reference body.

The rod-shaped reference body 3' shown in FIG. 3 consists of structural elements that have a profile-like structure with an octagonal cross section 7. The structural elements themselves can be used as reference objects. Different reference objects, namely measuring markings 12, measuring points 13 and 3D object structures in the form of spheres 15, are also arranged on the profile structures of the structural elements.

The invention proposes a method for generating and linking 3D data sets in order to determine the three-dimensional shape and structure of objects as completely as possible (3D reconstruction method), wherein individual object regions are measured and subsequently linked with reference to a KOS. The method can be carried out in such a way that reference objects with known positions and/or known spacing in space and/or auxiliary objects with unknown positions and unknown spacing are at least temporarily situated on the measuring object and/or outside the measuring object in a fixed position relative to the object, and that parts of the object surface, the reference objects and/or the auxiliary objects are used for matching the object regions. The reference objects and/or the auxiliary objects may be geometrically regular or irregular. They may be described mathematical-geometrically, and their geometric parameters, e.g., position, center point coordinate, radius, curvature and/or spacing, can be used. Parts of the object surface and/or the reference objects and/or the auxiliary objects may be used for calibrating the measuring system and/or for calibrating one or more mechanical motion systems for the object during the matching process. It is preferred that a definitive code allocation (coding/label) of the reference objects used is carried out during the matching process. The reference objects and/or auxiliary objects may be defined by the structure of the object, e.g., bores and/or edges or the like. The reference objects and/or auxiliary objects may, when using optical measuring systems, be realized by means of optical structure projection, e.g., circular markings, lines and/or grids. An acquisition of relatively or incrementally measured data is possible. The reference objects may be present in the form of mathematical, virtual or synthetic models/datasets and used for the matching process. This also applies to a measured reference object or object to be measured, respectively. It is possible to use measured auxiliary objects and/or measured objects as reference objects. It is also possible to utilize additional measuring data of the measuring system obtained from reference objects, auxiliary objects and/or objects to be measured during the matching process, e.g., light intensity data when using optical measuring systems (color images, black/white images, video images of cameras) or motion data when using tactile measuring systems (angle of excursion).

The invention also proposes a device for carrying out the method according to the invention. The device is preferably characterized by the fact that reference objects and/or auxiliary objects are at least temporarily situated on the measured object and/or outside the measured object in a fixed position relative to the object, and that at least one mechanical/tactile or optical/contactless 3D coordinate measuring device determines the surface coordinates of the measured object and/or the reference object and/or the auxiliary object (in different individual object regions) In this case, the advantageous additional developments cited above with reference to the method can be used. One advantageous additional development is characterized by the fact that reference objects and/or auxiliary objects are fixed on at least one arbitrarily shaped reference body and used. The carrier of the reference body may also consist of the measured object itself. It is preferred that the reference body has a 1D, 2D or 3D structure. It is also preferred that it essentially contains at least one structural element with a line structure or screen structure, on which auxiliary objects and/or reference objects are arranged. A mounting device is preferably arranged on the reference body. It is advantageous that at least one such reference body is fixed or placed on, in front of or at least in the vicinity of the object by means of the mounting device.

It possible to carry out a definitive code allocation (coding/label) of the reference objects used during or after the matching process. It is preferred to produce correspondences between the reference objects. It is also possible to use additional measuring data of the measuring system obtained from the object and/or from the reference object(s) during the matching process, e.g., light intensity data when using optical measuring systems (for example, color images, black/white images or video images of cameras) or motion data when using tactile measuring systems (angle of excursion).

It is advantageous that parts of the object and/or the reference object(s) are used for determining the geometric parameters of the measured object during or after the matching process. This makes it possible to directly calculate geometric parameters of the objects while the method is carried out.

The method according to the invention also makes it possible to simultaneously check the measuring results, in particular, with respect to the (local and global) accuracy, etc., and thusly to monitor the KMG. The reference object(s) or the reference body can be used as the calibration body in this case. When checking the measuring results, it is accordingly preferred to utilize the reference object(s) as the calibration body.

The invention claimed is:

1. A method for determining the 3D shape of an object (5), comprising the steps of:
    measuring, with a sensor, several overlapping imaged regions of the object (5), having the same orientation to said sensor to generate several corresponding 3D data sets therefrom with reference to a 3D sensor coordinate system,
    simultaneously measuring a position of at least one reference object (4), with said sensor (1,2) during said measuring step, and
    linking, via a coordinate transformation, the several corresponding 3D data sets in said 3D sensor coordinate system with said simultaneously measured position of the at least one reference object (4) with reference to a three-dimensional coordinate system, and
    determining the 3D shape of the object (5) based upon said linking step without pre-determining said position of the at least one reference object (4) relative to the object (5).

2. The method according to claim 1, wherein reference object(s) (4) is/are arranged on a reference body (3) that can be connected to the object (5) by a mounting device.

3. The method according to claim 1, wherein reference object(s) (12, 13, 15) is/are geometrically regular or irregular.

4. The method according to claim 1, wherein reference object(s) (4) can be mathematical-geometrically described, and its/their geometric parameters, including position, center point coordinate, radius, curvature and/or spacing, are used.

5. The method according to claim 1, wherein parts of the object (5) or the object surface and/or reference object(s) (4) is/are used for calibrating a measuring system during or after a matching process.

6. The method according to claim 1, wherein parts of the object (5) or the object surface and/or reference object(s) (4) is/are used for calibrating one or more mechanical motion systems for the object during or after a matching process.

7. The method according to claim 1 for determining the 3D shape of an object (5), wherein
    the at least one reference object (4) is, when using optical measuring systems, realized by means of optical structure projection including circular markings, lines, or grids.

8. The method according to claim 1, wherein reference object(s) (4) is/are present in the form of mathematical, virtual or synthetic models or a corresponding data set and used for a matching process.

9. The method according to claim 1, wherein additional measuring data of the measuring system obtained form the object (5) and/or reference object(s) (4) is/are used during a matching process.

10. The method according to claim 1, wherein parts of the object (5) and/or reference object(s) (4) is/are used for determining geometric parameters of the object (5) during or after a matching process.

11. The method according to claim 1, wherein measuring results are checked and reference object(s) (4) is/are used as a calibration body.

12. A method according to claim 1, wherein said at least one reference object may be coplanar.

13. A method according to claim 1, wherein said at least one reference object is used to match said several overlapping imaged regions during said linking step.

14. A method according to claim 1, wherein not all measured regions from, among said several overlapping measured regions include said at least one reference object (4).

15. The method according to claim 1, wherein reference object(s) (4) is/are situated on the object (5) and/or outside the object (5).

16. The method according to claim 1, wherein a definitive code allocation (coding/label) of reference objects (4) used is carried out during or after a matching process.

17. The method according to claim 15, wherein reference object(s) (4) is/are defined by the structure of the object (5), including bores and/or edges and/or surfaces.

18. The method according to claim 16, wherein correspondences are produced between reference objects (4).

19. A device for determining the 3D shape of an object (5), comprising
    a 3D coordinate measuring device (3D-KMG) having a sensor (1,2) for measuring several overlapping imaged regions of the object (5), having the same orientation to said sensor (1,2) to generate several corresponding 3D data sets therefrom with reference to a 3D sensor coordinate system and for simultaneously measuring a position of at least one reference object (4) with said sensor (1,2) during the measurement of said several overlapping imaged regions;
    a computer structured and arranged to link, via a coordinate transformation, the several corresponding 3D data sets in said 3D sensor coordinate system with said simultaneously measured position of the at least one reference object (4),
    said computer being further structured and arranged for determining the 3D shape of the object (5) based upon said linking of the several corresponding 3D data sets, without predetermining the position of the at least one reference object (4) relative to the object (5).

20. The device according to claim 19, wherein reference object(s) (4) is/are situated on the object (5) and/or outside the object (5).

21. The device according to claim 19, wherein reference object(s) (4) is/are arranged on a reference body (3) that can be connected to the object (5) by a mounting device.

22. The device according to claim 19, wherein reference object(s) (4) can be mathematical-geometrically described, and its/their geometric parameters, including position, center point coordinate, radius, curvature and/or spacing, are used.

23. The device according to claim 19, including a mechanical motion system for the object (5).

24. The device according to claim 19, wherein reference object(s) (12, 13, 14, 15) is/are realized by means of optical structure projection, including circular markings, lines or grids, without pre-determining position of the reference object (4) relative to the object (5) being measured.

25. The device according to claim 19, wherein
    reference object(s) (4) is/are generated by one or more optical structure projectors, without pre-determining position of the reference object (4) relative to the object (5) being measured.

26. The device according to claim 19, having measuring system components for determining additional measuring data of reference objects (4) and/or the objects (5) to be measured.

27. The device according to claim 19, additionally comprising a reference body (3) formed as a 1D, 2D, or 3D structural element with a line structure or screen structure, and on which one or more reference object(s) (12, 13, 14, 15) is/are arranged.

28. A device according to claim 19, wherein said at least one reference object is used to match said several overlapping imaged regions during said linking of the several corresponding 3D data sets in said 3D sensor coordinate system with said simultaneously measured position, via the coordinate transformation.

29. A device according to claim 19, wherein said at least one reference object is used to match said several overlapping imaged regions during said linking step.

30. A device according to claim 19, wherein not all measured regions from among said several overlapping measured regions include said at least one reference object (4).

31. The device according to claim 19, comprising a plurality of reference objects (12, 13, 15) which are each individually geometrically regular or irregular.

32. A device according to claim 19, wherein said at least one reference object(s) (4) is generated by one or more optical structure projectors, without pre-determining said position of the reference object (4) relative to the object (5) being measured.

33. The device according to claim 31, additionally comprising
a reference body (3) formed as a 1D, 2D, or 3D structural element with a line structure or screen structure, and on which one or more reference object(s) (12, 13, 14, 15) is/are arranged.

34. A device according to claim 32, wherein said optical structure projectors include circular markings, lines or grids.

35. A device for determining the 3D shape of an object (5), comprising:
a 3D coordinate measuring device (3D-KMG) having a sensor (1,2) for measuring several overlapping imaged regions of the object (5), having the same orientation to said sensor (1,2) to generate several corresponding 3D data sets therefrom with reference to a 3D sensor coordinate system and for simultaneously measuring a position of at least one reference object (4) with said sensor (1,2) during the measurement of said several overlapping imaged regions;
a computer structured and arranged to link, via a coordinate transformation, the several corresponding 3D data sets in said 3D sensor coordinate system with said simultaneously measured position of the at least one reference object (4),
said computer being further structured and arranged for determining the 3D shape of the object (5) based upon said linking of the several corresponding 3D data sets, without predetermining the position of the at least one reference object (4) relative to the object (5);
a plurality of reference objects (12, 13, 15) which are each individually geometrically regular or irregular;
a reference body (3) in the form of a rod positioned upon the object (5) comprising measured markings (12), grids (14) and 3D object structures in the form of truncated pyramids (15) on which one or more of said plurality of reference object(s) (12, 13, 15) are arranged.

36. The device according to claim 35, comprising additional reference objects (6) applied onto the object (5).

37. A device for determining the 3D shape of an object (5), comprising:
a 3D coordinate measuring device (3D-KMG) having a sensor (1,2) for measuring several overlapping imaged regions of the object (5), having the same orientation to said sensor (1,2) to generate several corresponding 3D data sets therefrom with reference to a 3D sensor coordinate system and for simultaneously measuring a position of at least one reference object (4) with said sensor (1,2) during the measurement of said several overlapping imaged regions;
a computer structured and arranged to link, via a coordinate transformation, the several corresponding 3D data sets in said 3D sensor coordinate system with said simultaneously measured position of the at least one reference object (4),
said computer being further structured and arranged for determining the 3D shape of the object (5) based upon said linking of the several corresponding 3D data sets, without predetermining the position of the at least one reference object (4) relative to the abject (5);
a plurality of reference objects (12, 13, 15) which are each individually geometrically regular or irregular;
a reference body (3) in the form of a rod positioned upon the object (5) comprising measured markings (12), grids (14) and 3D object structures in the form of truncated pyramids (15) on which one or more of said plurality of reference object(s) (12, 13, 15) are arranged;
a reference body (3') in the form of a rod having an octagonal cross-section (7), each said octagonal cross-section (7) comprising a measured marking (12) or measuring point (13) and being inter-connected with an adjacent octagonal cross-section (7) through a 3D object structure (15) in the form of a sphere on which one or more of said plurality of reference object(s) (12, 13, 15) are arranged.

* * * * *